June 8, 1965  R. P. HEINTZ  3,187,733
FUEL INJECTION SYSTEM FOR INTERNAL COMBUSTION ENGINES
Filed Aug. 23, 1963  3 Sheets-Sheet 1
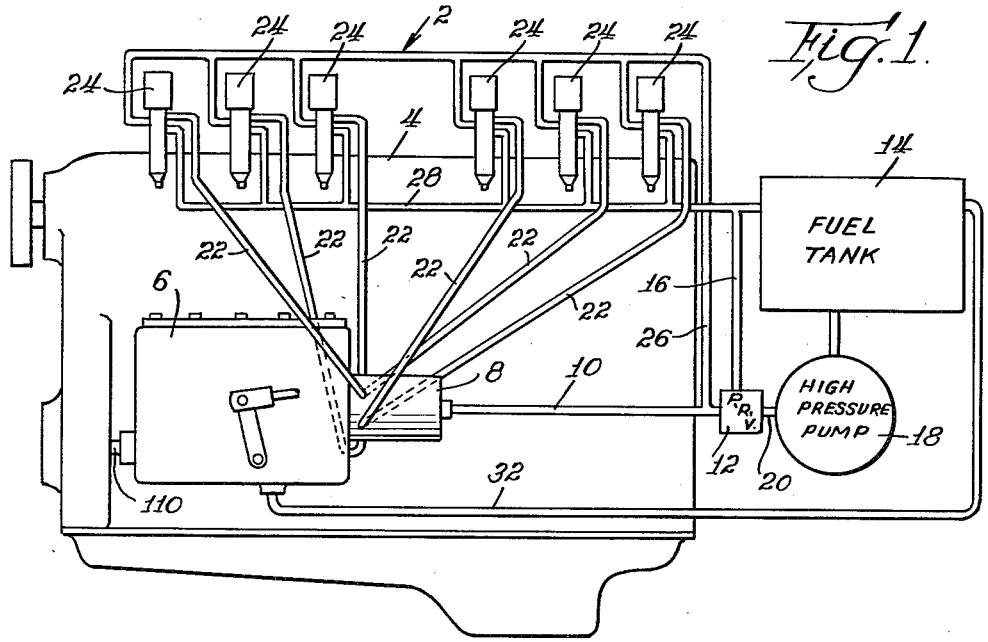
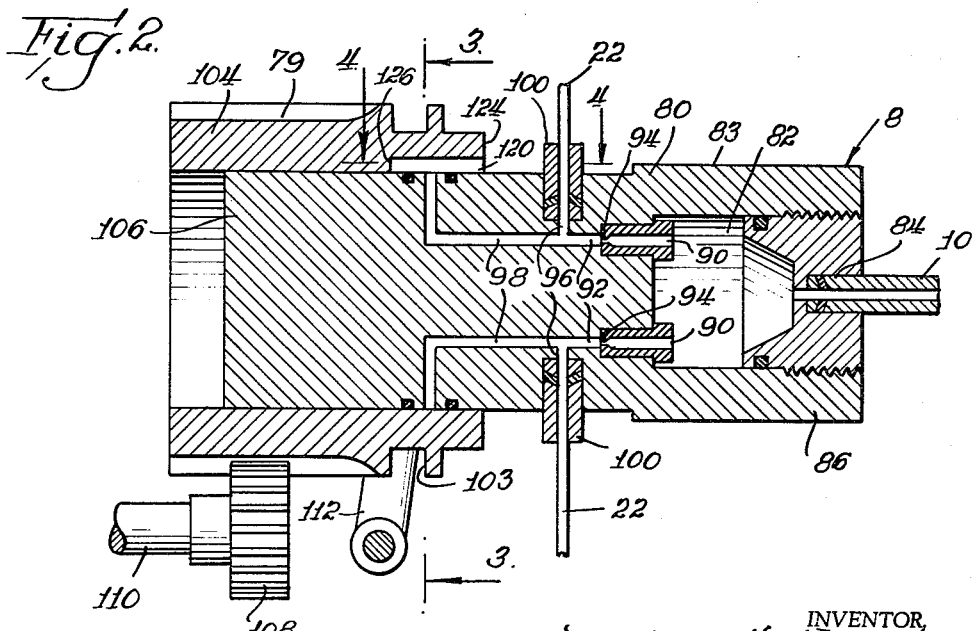
INVENTOR,
Richard P. Heintz
BY Richard J. Myers
atty.

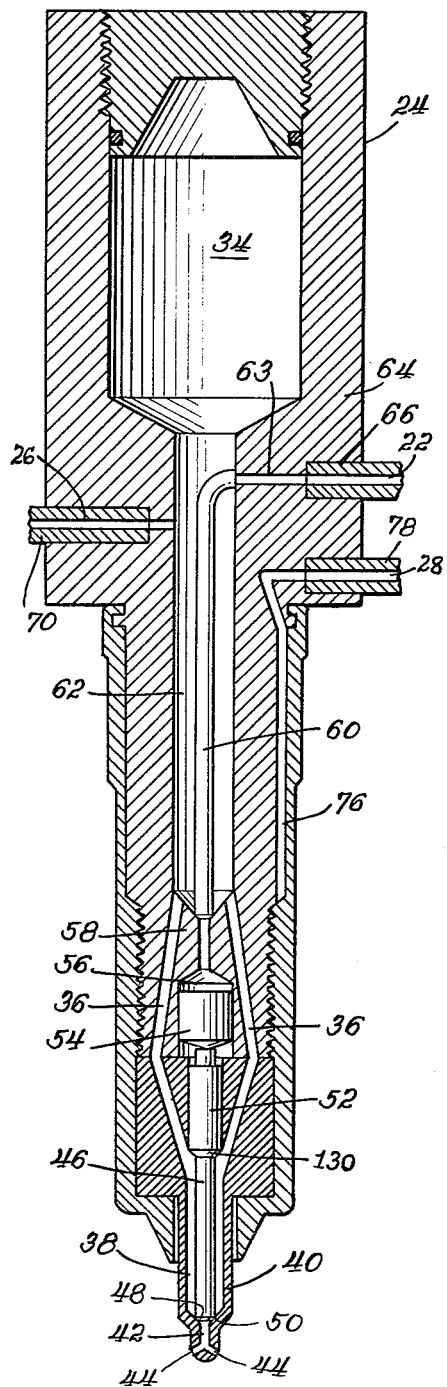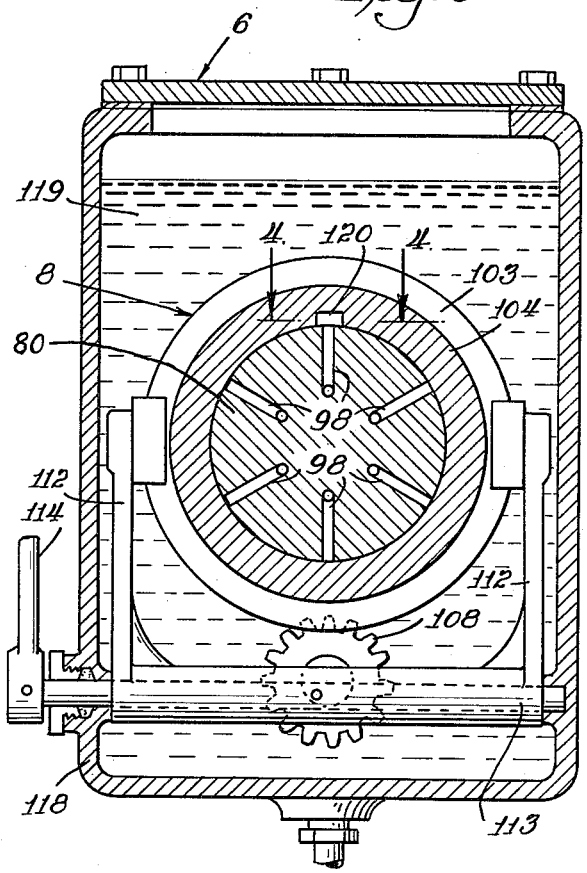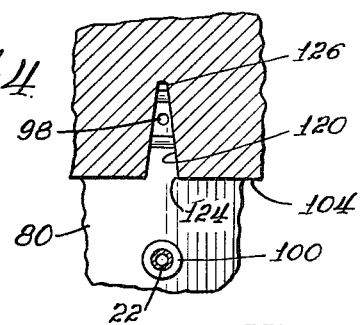

June 8, 1965  R. P. HEINTZ  3,187,733
FUEL INJECTION SYSTEM FOR INTERNAL COMBUSTION ENGINES
Filed Aug. 23, 1963  3 Sheets-Sheet 3

INVENTOR.
Richard P. Heintz
BY Richard J. Myers
Att'y

3,187,733
FUEL INJECTION SYSTEM FOR INTERNAL COMBUSTION ENGINES

Richard P. Heintz, Kalamazoo, Mich., assignor, by mesne assignments, to International Harvester Company, Chicago, Ill., a corporation of New Jersey
Filed Aug. 23, 1963, Ser. No. 303,993
1 Claim. (Cl. 123—139)

This invention relates to fuel injection systems and in particular to fuel injection systems for an internal combustion engine having one or more fuel injectors, each injector having an energy storing fuel accumulator and receiving fuel under high pressure which is injected from the accumulator into a respective engine cylinder upon operation of an associated injector valve by a rotary distributor type mechanism operable in accordance with speed of the engine.

When greater horsepower requirements are demanded of engines of the fuel injection type it is a problem to deliver sufficient quantity of fuel in a short duration. If the fuel pressure can be built up over a longer period of time and the fuel stored under this pressure in an injector accumulator this results in reducing the loading on the components of the injection system. In this situation the accumulator is acting as a storage of potential energy, the release of which does not appreciably affect the pressure of injection. This accumulation and release of fuel energy is accomplished in this invention by the utilization of a rotary distributor valve which allows charging of a number of injector accumulators while allowing another injector accumulator to release fuel under pressure into an associated engine cylinder without appreciable depletion of such injection pressure. This may be attained by use of a single distributor valve means having a fluid pressure receiving and transmitting member that has a sleeve means relatively rotatable about the fuel receiving and distributing member allowing charging of fuel in the injector accumulator over a long period of time and whereby the beginning and length of injection is determined. Under such an arrangement the timing of injection as well as the quantity of fuel injected may be varied resulting also in the simplicity in construction and reduction in the number of parts.

It is therefore a general object of this invention to produce a novel fuel injection system employing one or more fuel injectors each having an energy storing fuel accumulator in the injector wherein a rotary distributor valve periodically hydraulically operates the injector or injectors for injection of fuel under high pressure from the accumulator into an engine cylinder or cylinders.

Another object of this invention is to provide a fuel injection system comprising a plurality of injectors each having a fuel injector accumulator supplied by a common fuel source under high pressure in accordance with dictates of a single rotary distributor valve that hydraulically actuates a given injector in a timed sequence for injection of fuel from a respective accumulator into an associated engine cylinder.

It is a further object of this invention to provide a plurality of fuel injectors, each having an energy storing fuel accumulator for collecting engine fuel under high pressure and being in selected communication with an injector nozzle and an associated engine controlled rotary distributor valve receiving fluid under pressure and providing periodic hydraulic pressure for operation of a respective injector nozzle valve with attendant discharge of fuel from an accumulator into an engine cylinder, wherein said rotary valve comprises sleeve means cooperative with a member receiving such fluid under pressure, the sleeve means being provided with a passage selectively communicating with a low pressure source and with the hydraulic fluid in the member and providing a pulsating pressure for operation of the injector nozzle valve.

Another object of this invention is to provide a rotary distributor valve means of the type described for operating a plurality of injection nozzle valves wherein said distributor valve means is provided with an energy storing fluid accumulator for the collection of fluid under pressure.

Another object of this invention is to provide a fuel injection system of the type mentioned above wherein components are simplified and reduced in number and provide for less wear on such components.

These and other objects will become more apparent from references to the following description and accompanying drawings notwithstanding that said description and drawings are not to be construed as a limitation upon the breadth or scope of the appended claim to wit:

FIGURE 1 is a schematic view of the fuel injection system employed upon an engine;

FIGURE 2 is a cross sectional view of the rotary distributor valve of the invention;

FIGURE 3 is a view taken along line 3—3 of FIGURE 2;

FIGURE 4 is a partial section view taken along lines 4—4 of FIGURES 2 and 3;

FIGURE 5 is a sectional view of an injector of the invention;

Figure 6:
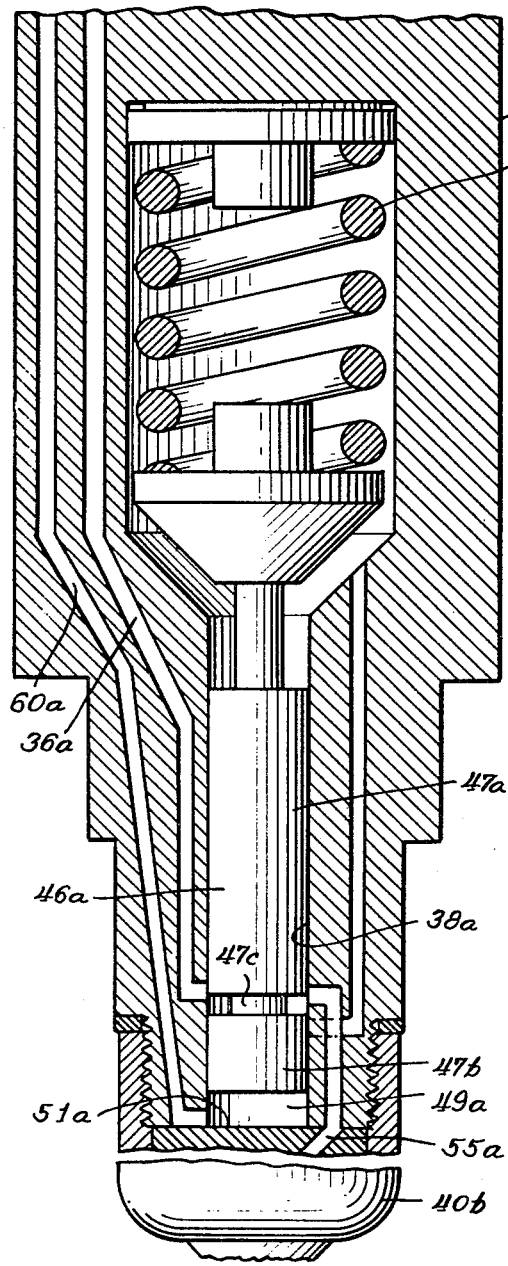
FIGURE 6 is a partial sectional view of a modified injector of my invention.

With reference now to FIGURES 1 through 5 there is shown a fuel injection system 2 employed for the injection of fuel into a six cylinder diesel-type internal combustion engine 4 and comprises a fuel control and distributing mechanism 6 having at one end thereof a rotary distributor-type valve assembly 8 receiving fuel from a fuel line 10 communicating with a pressure regulator valve 12 communicating with fuel tank 14 by fuel line 16 and with a high-pressure pump 18 by way of line 20 and distributing fuel under pressure by way of six control pressure lines 22 to injectors 24, the high-pressure fuel pump 18 also sending fuel under high pressure by way of rail pressure line 26 to the injectors 24 and drain line 28 returning fuel from each of six engine injectors 24 to the fuel tank 14. A drain line 32 runs from the unit 6 to the reservoir 14.

Each injector 24 comprises an accumulator chamber 34 connecting with a pair of fuel lines 36 terminating in a common fuel passage 38 within nozzle portion 40 having a nozzle chamber or passage 42 terminating into a plurality of nozzle orifices 44 within an engine cylinder (not shown). The nozzle chamber 38 contains a nozzle valve 46 having an end 48 held against seat 50 of the nozzle portion 40 and has an opposed end portion 52 engaging a control pressure piston 54 within a chamber 56 of housing portion 58 also carrying the end portion 52. The chamber 56 communicates with fuel line 60 within the forward accumulator chamber portion 62, the line 60 being affixed to the injector housing 64 which has a passage 63 communicating with the line 60 and with inlet fitting 66 of the control pressure line 22. The fuel under high pressure from the pump 18 enters into the injector housing 64 by way of fitting 70 of line 26 between the nozzle portion and the accumulator 34. The drain line 28, having fitting 78 in housing 64, receives any fuel due to leakage in the injector 24 for carrying such fuel back to the fuel tank 14.

It will be seen that six such injectors 24 are employed by this six-cylinder engine. They are all similarly constructed, each having connection with the rail pressure line 26 and with a respective control pressure line 22 emanating from the rotary distributor or control valve assembly 8.

As seen in FIGURES 2, 3 and 4, the rotary control valve 79 of assembly 8 has a non-rotating central member 80 having a central chamber or accumulator 82 located at one end 83 thereof in communication with fuel line 10 entering fitting 84 in housing 86. Six fuel passages 90 (only two of which are seen in FIGURE 2) in the body 80 communicate between the accumulator 82 and six fuel passages 92 in the body 80, each passage 90 having a restriction 94. The lines 92 branch into lines 96 and 98, each of the lines 96 leading to a respective fitting 100 of a respective control pressure line 22 communicating with a respective fuel line 60, and each branch line 98 communicating with a rotatable sleeve element 104 about end portion 106 of the body 80, the sleeve being driven by gear 108 of engine driven shaft 110 and having a control lever arm 112 of control lever assembly 113 connectingly engaging the sleeve channel 103 of sleeve 104 for axially moving said sleeve upon movement of lever arm 114 of assembly 113 through manual operated linkage (not shown) and carried on the housing 118 of the unit 6, the rotary valve assembly 8 being immersed in fuel 119 under low pressure within the housing 118. The sleeve 104 has an internal peripheral slot 120 selectively registerable with each of the six passageways 98 upon rotation of said sleeve to the proper position, the slot 120 being widest at the outer end 124 of the sleeve 104 and tapering to a narrowest width at its inner end 126 for varying the time, a passage 98 will be in communication with the low pressure fuel 119 within the housing 118 as determined by the axial displacement of the sleeve by lever assembly 113.

In operation of the embodiment shown in FIGURES 1 through 5, it will be seen that each of the injectors 24 is hydraulically actuated by a respective control pressure line 22 in accordance with the movement of the rotating sleeve 104 to allow high pressure fuel in the passage 36 to be injected out of the nozzle and into the engine cylinder as follows: Fuel from the high pressure pump 18 is conveyed along common rail line 26 to each of the injectors 24 while a portion of the fuel is directed along line 10 to the rotary distributor valve assembly 8. The fuel entering the injector accumulator 34 by rail line 26 through fitting 70 of a respective injector 24, charges the accumulator 34, passages 36 and chamber 38 and cannot be injected through nozzle orifices 44 so long as the differential valve 46 remains on its seat 48. The differential valve 46 is held on its seat 48 by the pressure of the fuel in the control pressure line 60 communicating with line 22, line 98 in the stator element 80, and accumulator 82 which has been charged by line 10 from the fuel delivered by the high-pressure pump 18. As shown in FIGURE 2, the slot 120 registers with the upper line 98 but not the lower line 98 and therefore the lower lines 92 and 22 are under pressure but the upper lines 92 and 22 are not with the result that the injector 24 in communication with the lower control line 22 has fuel under pressure against the respective injector piston 54 holding the nozzle valve 46 on its seat 48. At this time, the pressure in the upper lines 92 and 22 will have fallen off with upper line 98 being opened to low pressure fuel 49 in housing 118 by way of slot 120 in sleeve 104, there being insufficient pressure holding piston 54 against valve 46, the associated injector 24 allowing fuel under pressure from that particular accumulator 34 on an area 130 of that particular differential valve 46 to quickly unseat the nozzle valve 46 and allowing injection of the fuel through the nozzle orifices 44.

Thus it can be seen that depending on the position of the slot 122 of the rotary sleeve 104 with respect to a respective fuel passage 98 in the stator element 80 will determine when injection will occur from the particular injector 24 involved. The accumulator 34 in such injector 24 allows storing up of the high pressure fuel when injection is occurring and injection of fuel therefrom into its associated combustion chamber or engine cylinder does not appreciably affect the pressure of the fuel stored in its accumulator. Thus, energy is capable of being stored in the accumulator which energy is expended at the time of injection. Similarly, the accumulator 82 allows a storage of the potential energy of the control pressure, the restrictors 94 in the line 90 preventing appreciable dissipation of this energy by minimizing the amount of fuel loss in the accumulator 82 when a particular line 98 is opened to spill by way of port 120 in sleeve 104 into the housing 118.

Figure 7:
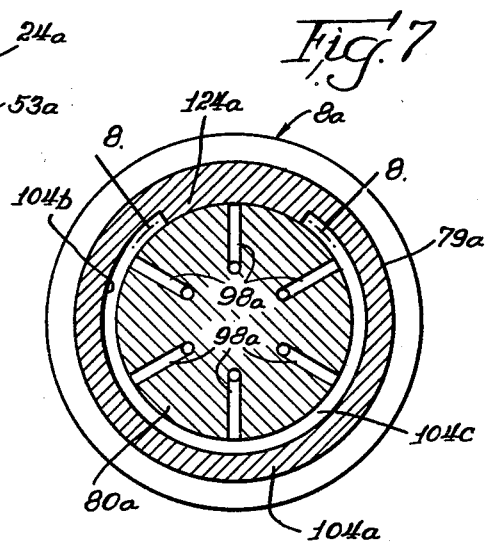
FIGURE 7 is a partial sectional view of a modified form of the distributor valve shown in FIGURE 3.
Figure 8:
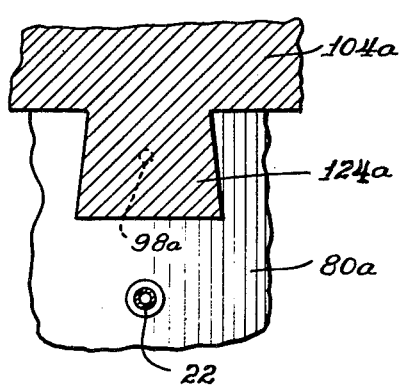
FIGURE 8 is a sectional view along the line 8—8 of FIGURE 7.

In the modification of the fuel injector 24a shown in FIGURES 6 through 8, the operation is similar to the first embodiment except that an increase of pressure in the pressure control line 22 by operation of distributor valve 79a of valve mechanism 8a allows injection to occur and the decrease in pressure in the control line 22 terminates injection of fuel from the nozzle portion 40b into the combustion chamber (not shown), as follows:

The injector 24a, as shown in FIGURE 6, is provided with a high pressure fuel passage 36a communicating with rail 26 and a control pressure passage 60a communicating with control pressure line 22 from valve 79a, the passage 36a communicating with a chamber 38a in which is disposed a piston valve element 46a having lands 47a and 47b separated by a reduced spool portion 47c, the land 47b defining a variable sized chamber zone 49a with piston seat 51a in communication with the passage 60a. The piston valve 46a is normally biased against the bottom or seat 51a of the chamber 49a by the spring 53a. A passage 55a leads from the opposite side of the chamber 38a to the lower nozzle portion 40b of the injector 24a which has a differential type valve as shown in the first embodiment. The sleeve 104a of the control valve 79a instead of having a groove, as shown in the first embodiment, is provided with a port blocking element 124a and defines with its inner surface 104b and body 80a a drain passage 104c to housing 118 and communicating with all but one of the control lines 98a leading to the injectors 24a. The member 124a is wedge-shaped, tapering inwardly, as shown in FIGURE 8 to provide a variable time for injection upon axial movement of the sleeve 104a by the means provided in the first embodiment. Consequently, it will be seen that one control line 98a is always blocked by the member 124a preventing spilling of the fuel 119 into the housing 118 and allowing control pressure to move the valve 46a against the action of the spring 53a into such a position as to allow the rail line 26 and passage 36a to be in communication with the area about the reduced spool 47c which in turn is in communication with the passage 55a leading to the nozzle portion 40b for injection to occur as aforesaid in the first embodiment, whereas the passages 98a and control lines 22 of the other injectors 24a are opened to drain allowing the spring 53a of each injector 24a to seat the valve 46a against the bottom 51a blocking communication of the high pressure lines 26 with the nozzle portion 40b and preventing injection of fuel under high pressure into a respective engine cylinder or combustion chamber.

Thus, it is seen that the invention provides an improved fuel injection system wherein a single rotary valve means provides an extended period of time for charging a plurality of injector accumulators receiving fuel from a common high pressure source and determines the beginning and duration of fuel injection from the injector. Such system is composed of components that are simplified and that have the durable construction needed for high pressure fuel injection.

I claim:

In a fuel injection system for an engine, the combination comprising a plurality of injectors, each injector having an accumulator portion and a nozzle portion communicating with the accumulator portion, a nozzle valve in the nozzle portion, a source of fuel under high pressure communicating with the accumulator portion of each injector for storage of fuel therein and with the nozzle portion of each injector, control pressure means having a plurality of control lines each interconnecting a source of hydraulic fluid under pressure and a different one of said nozzle valves, each nozzle valve having a first position for injection of the fuel from the nozzle portion and a second position preventing injection of fuel from the nozzle portion in accordance with the rise and fall of fluid pressure in the respective control line, rotary actuated valve means comprising passage means in communication with a low pressure source, and a body having separate means of communication with the control lines and with the source of hydraulic fluid under pressure, an actuator sleeve about the body relatively rotatable with respect to the body, conduit means within the body corresponding to the number of injectors, each conduit means being in communication with the pressurized hydraulic fluid and a separate control line and in selective communication with the passage means in accordance with the position of the body with respect to the sleeve whereby the relative rotation of the body with respect to the sleeve is operative to vary the pressure in a respective control line for initiating and terminating injection of fuel from a respective nozzle portion, said body having a fluid accumulator communicating between the source of fluid and each of the conduit means, and fluid restriction means being between said fluid accumulator and the passage means to inhibit depletion of fluid from the accumulator to the low pressure source.

References Cited by the Examiner
UNITED STATES PATENTS

| | | | |
|---|---|---|---|
| 2,150,574 | 3/39 | Amery | 239—95 |
| 2,265,534 | 12/41 | Lloyd et al. | 123—139 |
| 2,323,184 | 6/43 | Amery | 123—139 |
| 2,347,363 | 4/44 | Palumbo | 239—95 |
| 2,916,028 | 12/59 | Mansfield | 123—139 |

FOREIGN PATENTS 526,723   9/40   Great Britain.

RICHARD B. WILKINSON, *Primary Examiner.*